(12) United States Patent  (10) Patent No.: US 8,597,159 B2
Pietron et al.  (45) Date of Patent: *Dec. 3, 2013

(54) METHODS AND SYSTEMS FOR ASSISTED DIRECT START CONTROL

(75) Inventors: Gregory Michael Pietron, Canton, MI (US); Seung-Hoon Lee, Northville, MI (US); Alex O'Connor Gibson, Ann Arbor, MI (US); Yuji Fujii, Ann Arbor, MI (US); Roger Lyle Huffmaster, Canton, MI (US); Peter John Grutter, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 982 days.

This patent is subject to a terminal disclaimer.

(21) Appl. No.: 12/629,738

(22) Filed: Dec. 2, 2009

(65) Prior Publication Data

US 2011/0130245 A1  Jun. 2, 2011

(51) Int. Cl.
*F16H 61/58* (2006.01)
(52) U.S. Cl.
USPC .......................................... 477/62; 192/3.29
(58) Field of Classification Search
None
See application file for complete search history.

(56) References Cited

U.S. PATENT DOCUMENTS

| 2,699,074 | A  | * | 1/1955  | Livezey et al. ................. 477/61 |
|---|---|---|---|---|
| 6,215,476 | B1 |   | 4/2001  | Depew et al. |
| 6,463,375 | B2 |   | 10/2002 | Matsubara et al. |
| 6,556,910 | B2 |   | 4/2003  | Suzuki et al. |
| 6,730,000 | B1 | * | 5/2004  | Leising et al. ............... 477/110 |
| 7,146,960 | B2 |   | 12/2006 | Phlips et al. |
| 7,524,266 | B2 | * | 4/2009  | Nobumoto et al. .......... 477/110 |
| 8,192,328 | B2 | * | 6/2012  | Nedorezov et al. ............ 477/94 |
| 8,328,687 | B2 | * | 12/2012 | Gibson et al. .................. 477/92 |
| 2002/0046732 | A1 |   | 4/2002  | Katou ...................... 123/339.24 |
| 2006/0102138 | A1 |   | 5/2006  | Steiner et al. |
| 2007/0078040 | A1 | * | 4/2007  | Nobumoto et al. ............ 477/70 |
| 2010/0174459 | A1 | * | 7/2010  | Gibson et al. .................. 701/54 |
| 2010/0174460 | A1 | * | 7/2010  | Gibson et al. .................. 701/54 |
| 2010/0174465 | A1 | * | 7/2010  | Gibson et al. .................. 701/70 |
| 2011/0130245 | A1 | * | 6/2011  | Pietron et al. .................. 477/62 |

* cited by examiner

*Primary Examiner* — David D Le
*Assistant Examiner* — Steven B Christ
(74) *Attorney, Agent, or Firm* — Julia Voutyras; Alleman Hall McCoy Russell & Tuttle LLP (57) ABSTRACT

Methods and systems are provided for controlling a vehicle system including a selectively shut-down engine, a torque converter and a torque converter lock-up clutch. One example method comprises, during an idle-stop engine shut-down, restricting flow of transmission fluid out of the torque converter, and adjusting engagement of the torque converter lock-up clutch to adjust a drag torque on the engine to stop the engine.

14 Claims, 6 Drawing Sheets

METHODS AND SYSTEMS FOR ASSISTED DIRECT START CONTROL

FIELD

The present application relates to methods and systems for controlling an engine shut-down.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like. As such, a number of methods may be used to control the transmission to improve idle-stops and subsequent restarts, when restart conditions are met.

One such example is illustrated by Suzuki et al. in U.S. Pat. No. 6,556,910 B2. Therein, a plurality of transmission forward clutches are controlled by a hydraulic servo to shift the clutches between engaged and disengaged states when adjusting between idle-stop and restart conditions. Specifically, when an idle-stop condition is satisfied, the transmission is maintained in gear and a hydraulic pressure of the hydraulic servo is also maintained at a predetermined pressure.

However, the inventors have recognized several potential issues with such a method. As one example, during idle-stop conditions, the time required to stop the engine, for example the time required to drop the engine speed from 700 RPM to zero, may be longer than desired. As such, if the time needed for engine shut-down is too long, a vehicle operator may choose to restart and/or launch the vehicle before the engine speed has dropped to zero.

Thus in one example, some of the above issues may be addressed by a method of controlling a vehicle system including an engine that may be selectively shut down, the system further including a torque converter and a torque converter lock-up clutch. One example embodiment comprises, during an idle-stop engine shut-down, restricting flow of transmission fluid out of the torque converter, and adjusting engagement of the torque converter lock-up clutch to adjust a drag torque on the engine to stop the engine.

In one example, a flow restriction valve may be included in the hydraulic circuit of a torque converter to thereby restrict (for example, fully restrict or partially restrict) the flow of transmission fluid out of the converter. As such, restricting flow out of the torque converter may include restricting a flow of transmission fluid into a system cooler and/or lube. The position of the flow restriction valve may be varied based on the nature of the torque converter. For example, when the torque converter is a two-pass torque converter, the flow restriction valve may be positioned in a converter release circuit. Alternatively, when the torque converter is a three-pass or closed-piston type torque converter, the flow restriction valve may be positioned in a clutch out circuit. During an idle shut-down operation, that is, when the engine is shut-down responsive to idle-stop conditions and without receiving a shut-down request from the vehicle operator, an engine controller may close the flow restriction valve to enable an increase in the torque capacity of the torque converter lock-up clutch. As such, during an engine idle-stop shut-down, the drop in engine speed leads to a corresponding drop in output from an engine-driven mechanical pump. The consequent drop in hydraulic pressure may reduce the capacity of transmission clutches, such as the torque converter lock-up clutch. Herein, by closing the flow restriction valve during the engine shut-down, at least some clutch capacity may be restored (for example, less than full capacity may be restored), by restoring at least some hydraulic pressure.

To expedite engine shut-down, the controller may further command the torque converter to be locked up, by adjusting an engagement of the torque converter lock-up clutch, to thereby apply a drag torque on the engine to stop the engine. A degree of engagement of the torque converter lock-up clutch may be adjusted responsive to operating conditions, such as an engine speed and/or a desired stopping position of the engine. In one example, when the engine speed is above a desired engine speed, the engagement of the torque converter lock-up clutch may be increased to increase the drag torque applied. In another example, when the engine speed is below a desired engine speed, the engagement of the torque converter lock-up clutch may be decreased to decrease the drag torque applied on the engine. In one example, the increased engagement of the torque converter lock-up clutch and the closed position of the flow restriction valve may be maintained until shut-down has been completed. Then, after completing the shut-down, the flow restriction valve may be opened to un-restrict flow of transmission fluid out of the torque converter, the engagement of the torque converter lock-up clutch may be reduced (for example, the lock-up clutch may be disengaged), and the torque converter may be unlocked. During a subsequent engine restart, the engine may be cranked with the torque converter lock-up clutch in the reduced engagement condition (or disengaged condition) and the flow restriction valve open. Then, as the engine speed rises, with the flow restriction valve open, the engagement of one or more transmission clutches may be modulated (for example, the engagement of a forward clutch may be increased). The flow restriction valve may also enable improved pressure control during conditions when the transmission fluid has lower flow rates through the torque converter.

In this way, a torque converter lock-up clutch may be advantageously used to apply a drag torque and expedite engine shutdown even during conditions of reduced pump output to the clutches. Specifically, by using a flow restriction valve to reduce flow of transmission fluid out of the torque converter, hydraulic pressure and torque-converter clutch capacity may be maintained even during conditions of reduced pump output. Furthermore, a duration of torque converter lock-up during engine shut-down conditions may be increased (for example, by increasing a duration of torque converter lock-up clutch engagement). By adjusting a degree and/or duration of engagement of a torque converter lock-up clutch, a drag torque may be applied to counteract a rotation of the engine by the ground, through the wheels and/or powertrain, thereby providing a faster engine shut-down. In addition to enabling a faster engine shut-down, crankshaft oscillations due to cylinder air-spring effects after the engine speed had reached zero, may be significantly dampened. In this way, repeated stop/start events may be better supported.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for expediting engine shut-down, when idle-stop conditions are met, by applying a torque converter clutch based drag torque on the engine. Specifically, a flow restriction valve may be included in the hydraulic circuit of a torque converter (FIG. 2) to adjust (for example, restrict or un-restrict) a flow of transmission fluid there-through. By adjusting flow through the torque converter, an actuation and/or degree of engagement of a torque converter lock-up clutch (TCC) may be adjusted. In this way, the torque converter lock-up clutch may be used as a drag torque actuator to expedite and/or control an engine shut-down process (FIG. 4). Similarly, during an engine restart process (FIG. 5), a TCC-based drag torque may be applied to rapidly reduce the engine speed to a threshold value, from where an engine starter may be rapidly actuated. By restricting flow only during idle-stop conditions (FIG. 3), the flow and pressure characteristics of transmission fluid in the torque converter may be modulated to thereby adjust an engagement state of the torque converter lock-up clutch. The concepts and routines introduced herein are further clarified with example engine shut-down and restart scenarios in FIG. 6. In this way, by applying a TCC-based drag torque during engine idle-stop conditions, the time required for shutting down an engine may be significantly reduced, thereby providing fuel efficiency benefits and better enabling frequent engine start/stops.

Figure 1:
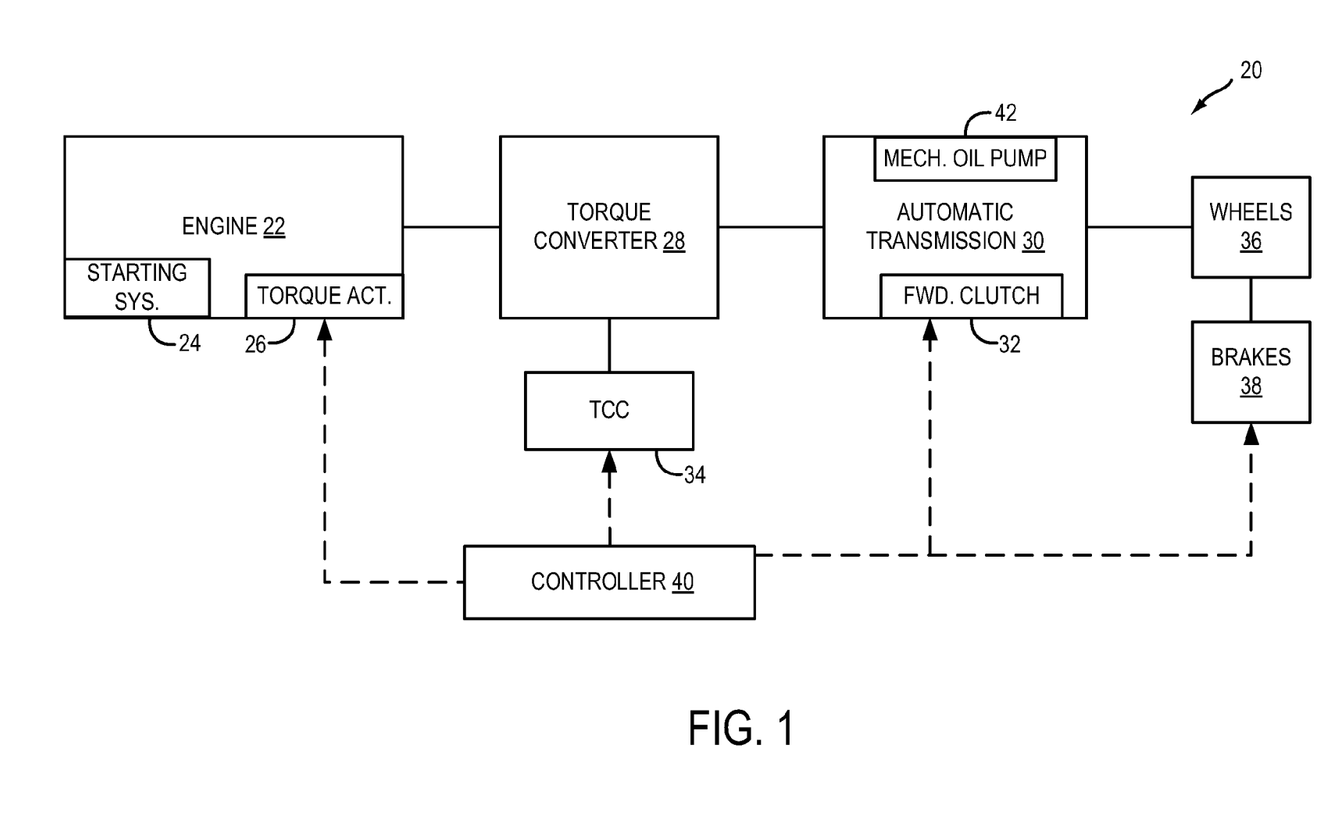
FIG. 1 shows an example vehicle system layout, including details of a vehicle drive-train.

FIG. 1 is a block diagram of a vehicle drive-train 20. Drive-train 20 may be powered by engine 22. In one example, engine 22 may be a gasoline engine. In alternate embodiments, other engine configurations may be employed, for example a diesel engine. Engine 22 may generate or adjust torque via torque actuator 26, such as a fuel injector, throttle, etc.

Engine 22 may include an auxiliary starter system 24 to support engine restart at near zero engine speed, for example at 50 RPM. In one example, the auxiliary starter system 24 may be used to restart the engine if a driver requests a vehicle launch while the engine is being spun down in response to prior fulfillment of idle-stop conditions. Auxiliary starter systems, however, may add significant cost and complexity to the engine system. Thus, in one example, by using a drag torque to expedite engine shut-down, the requirement for such auxiliary starter systems may be reduced. Consequently, the cost and complexity incurred by such starter systems in vehicle drive-train 20 may be reduced.

An engine output torque may be transmitted to torque converter 28 to drive an automatic transmission 30 by engaging one or more hydraulically actuated transmission components, or clutches, including forward clutch 32. As such, a plurality of such clutches may be engaged, as needed. Herein, torque converter 28 may also be referred to as a component of the automatic transmission 30. As further elaborated with reference to FIGS. 2A-C, torque converter 28 may be a two-pass, three-pass, or closed-piston type torque converter. The lock-up state of torque converter 28 may in turn be controlled by torque converter lock-up clutch 34 to thereby vary the torque output from the torque converter. As such, when torque converter lock-up clutch 34 is fully disengaged, torque converter 28 is unlocked. In this state, torque converter 28 transmits torque to automatic transmission 30 via fluid transfer between the torque converter turbine and torque converter impeller, thereby enabling torque multiplication. In contrast, when torque converter lock-up clutch 34 is fully engaged, torque converter 28 is locked-up. In this state, the engine output torque is directly transferred via the torque converter clutch to an input shaft (not shown) of transmission 30. Alternatively, torque converter lock-up clutch 34 may be partially engaged, thereby enabling the amount of torque relayed to the transmission to be modulated. A controller 40 may be configured to adjust an amount of torque transmitted by the torque converter by adjusting the actuation (or engagement state) of torque converter lock-up clutch 34 in response to various engine operating conditions, for example, an engine speed. In one example, the engagement state of the clutch (or degree of engagement of the clutch) may be varied by varying a clutch pressure and a direction of transmission fluid flow through the torque converter lock-up clutch.

Torque output from automatic transmission 30 may in turn be relayed to wheels 36 to propel the vehicle. Specifically, automatic transmission 30 may adjust an input driving torque at the input shaft (not shown) responsive to a vehicle traveling condition before transmitting an output driving torque to the wheels 36. Further, wheels 36 may be locked by engaging wheel brakes 38. In one example, wheel brakes 38 may be engaged in response to the driver pressing his foot on a brake pedal (not shown). In the same way, wheels 36 may be unlocked by disengaging wheel brakes 38 in response to the driver releasing his foot from the brake pedal.

An engine-driven mechanical oil pump 42 may be in fluid communication with the automatic transmission 30 to provide hydraulic pressure to engage various clutches, such as a forward clutch 32 and/or torque converter lock-up clutch 34. Mechanical oil pump 42 may be driven by the rotation of engine 22 or transmission input shaft, for example. Thus, the hydraulic pressure generated by mechanical oil pump 42 may increase as an engine speed increases, and may decrease as an engine speed decreases.

Controller 40 may be configured to receive inputs from engine 22 and accordingly control a torque output of the engine and/or operation of the torque converter, transmission, and/or brakes. As one example, a torque output may be controlled by adjusting a combination of spark timing, fuel pulse width, fuel pulse timing, and/or air charge, by controlling throttle opening and/or valve timing, valve lift and boost for turbocharged or supercharged engines. In the case of a diesel engine, controller 40 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 40 may control operation of the transmission components to control stopping of the engine. In one example, to decrease the duration of the engine spin down, a controllable drag torque may be applied to the engine via the transmission 30 and the torque converter 28. Specifically, the torque converter 28 may be used to transmit a drag torque generated by the stopped vehicle wheels through the gears of the transmission via torque converter lock-up clutch 34. In other words, an in-gear transmission may be used to apply and adjust an external friction torque (or drag torque) on the engine. In one example, when the torque converter lock-up clutch is fully engaged, and the wheels are held fixed to the ground via friction and/or the wheel brakes, a large drag torque can be applied to the engine (assuming the wheels do not break free from the ground). A larger drag torque may be applied if one or more alternate transmission clutches are additionally engaged, such as, for example, the transmission forward clutch. Similarly, the drag torque may be reduced by increasing the slip of at least the torque converter lock-up clutch.

The TCC-based drag torque applied can also be modulated by adjusting a degree of engagement of the torque converter lock-up clutch 34. For example, a larger drag torque can be generated by increasing engagement of the torque converter lock-up clutch while a smaller drag torque can be generated by decreasing engagement of the torque converter lock-up clutch. The degree of engagement of torque converter lock-up clutch 34 may be adjusted responsive to engine operating conditions, such as engine speed. For example, a controller may increase the degree of engagement of torque converter lock-up clutch 34 to increase the applied drag torque in response to the engine speed being above a desired engine speed, and decrease the degree of engagement of the clutch to decrease the applied drag torque in response to engine speed being below the desired engine speed. In one example, the desired engine speed may be a threshold speed below which a starter can be actuated to restart the engine (for example, in response to a sudden vehicle restart and/or re-launch request from the driver).

Figure 2A:
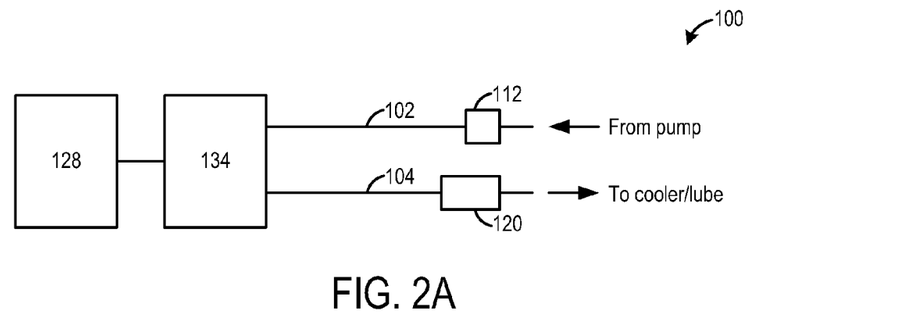
FIGS. 2A-C show example embodiments of a torque converter hydraulic circuit.
Figure 2B:
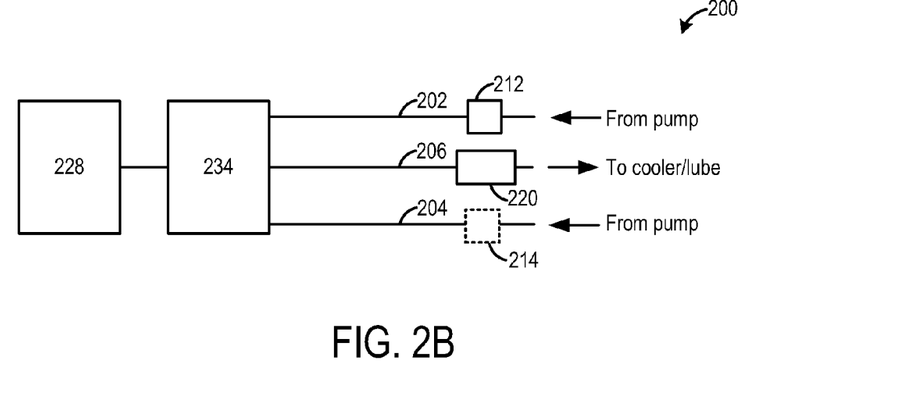
Figure 2C:
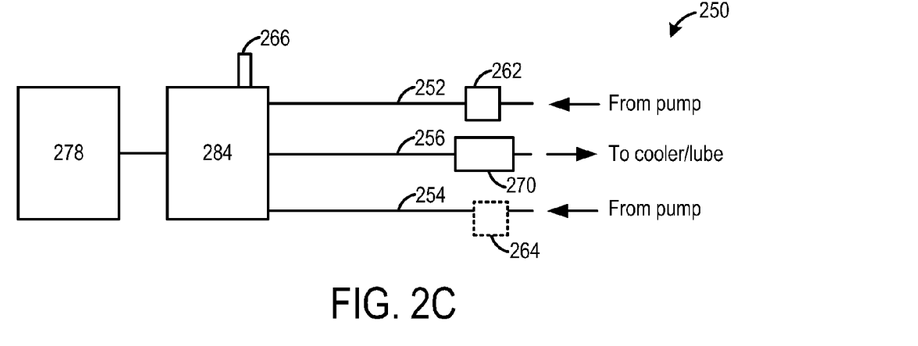
Figure 3:
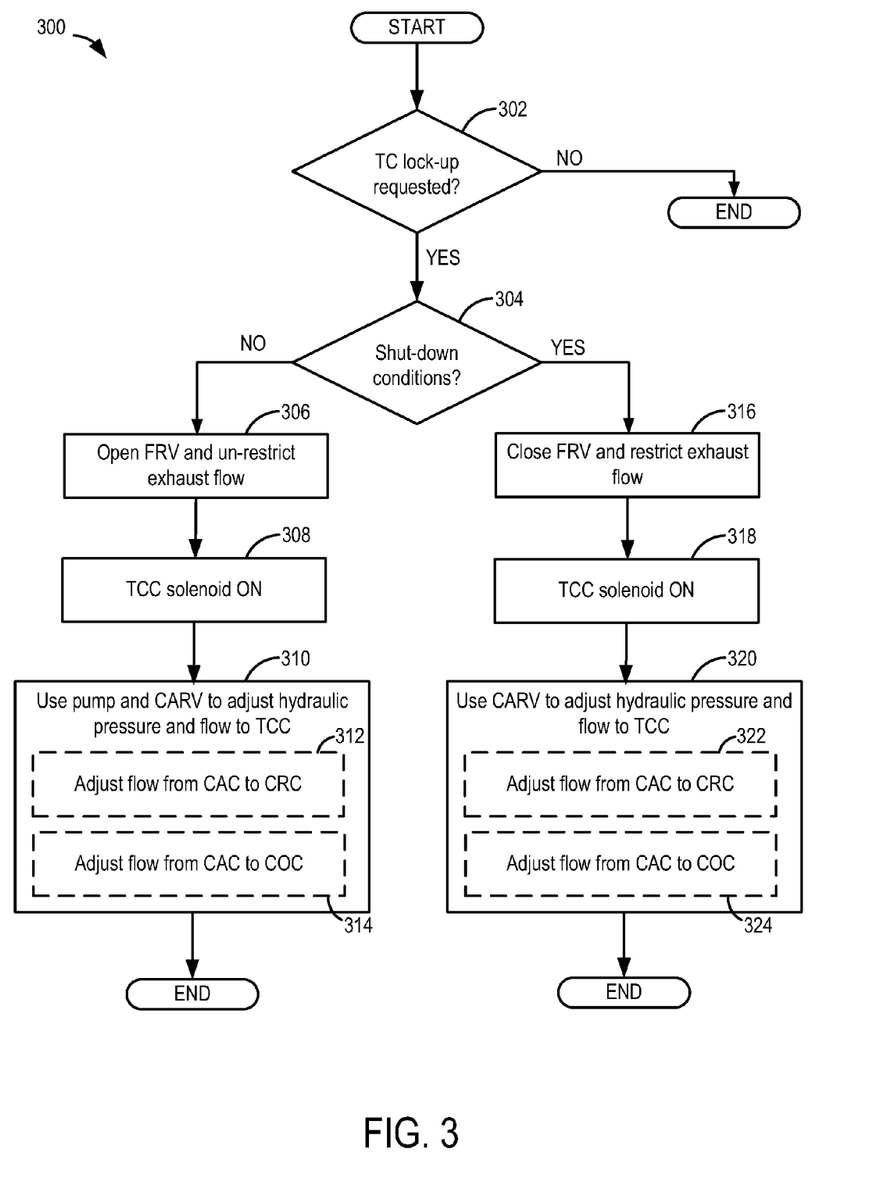
FIG. 3 shows a high level flow chart for a torque converter lock-up operation.
Figure 4:
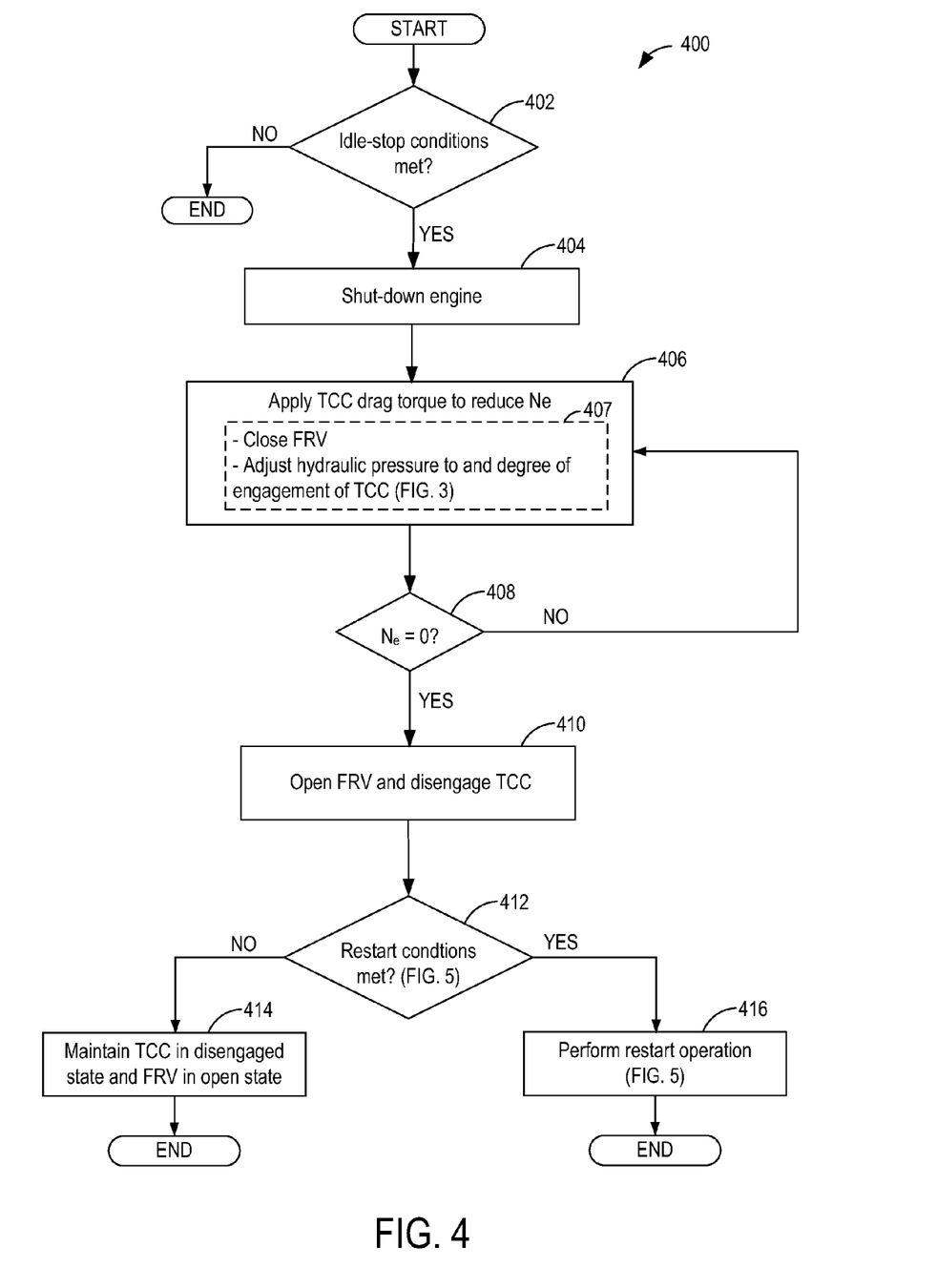
FIG. 4 shows a high level flow chart for executing an idle-stop operation by applying a torque converter lock-up clutch-based drag torque according to the present disclosure.

As further elaborated with reference to FIG. 3, the engagement of the torque converter lock-up clutch may be controlled by selectively adjusting a direction of flow and a hydraulic pressure of transmission fluid through the torque converter. As such, during an engine shut down, the drop in engine speed leads to a corresponding drop in pump output. This, in turn, leads to a drop in hydraulic pressure through the torque converter lock-up clutch, and a drop in clutch capacity. By closing a flow restriction valve (FIGS. 2A-C) included in the hydraulic circuit of the torque converter during the engine shut-down, at least some torque converter lock-up clutch capacity may be restored (for example, less than full capacity may be restored). This improvement in flow and pressure of transmission fluid through the torque converter lock-up clutch enables the TCC-based drag torque to be applied and adjusted during an engine shut-down even during reduced pump output.

Now turning to FIGS. 2A-C, example embodiments of a torque converter hydraulic circuit are described. In each embodiment, the direction of flow of transmission fluid through the hydraulic circuit determines a state of engagement of the torque converter clutch, and thereby, a lock-up state of the torque converter.

FIG. 2A depicts a first torque converter hydraulic circuit 100 including a two-pass torque converter 128 coupled to a torque converter lock-up clutch 134. The two-pass torque converter may include two hydraulic lines providing flow of transmission fluid in and out of torque converter 128 via torque converter lock-up clutch 134. Specifically, converter apply circuit 102 is configured to supply transmission fluid from a pump into torque converter lock-up clutch 134 while converter release circuit 104 is configured to exhaust transmission fluid from torque converter lock-up clutch 134 into a cooler and/or lube. As such, the direction of flow determines the engagement state of torque converter lock-up clutch 134. Specifically, flow of transmission fluid into converter apply circuit 102 enables torque converter lock-up clutch 134 to be engaged while flow of transmission fluid into converter release circuit 104 enables torque converter lock-up clutch 134 to be disengaged (or released). As previously elaborated, when torque converter lock-up clutch 134 is engaged, torque converter 128 may be locked-up. In contrast, when torque converter lock-up clutch 134 is disengaged, torque converter 128 may be unlocked.

Flow through converter apply circuit 102 and converter release circuit 104 may be regulated, at least in part, by clutch apply regulatory valve 112. In one example, clutch apply regulatory valve 112 may be a flow regulator spool valve controlled by a dedicated pressure control solenoid or variable force solenoid. In response to a first torque converter lock-up clutch solenoid command (for example, energization or de-energization), clutch apply regulatory valve 112 may direct transmission fluid into converter apply circuit 102 to engage torque converter lock-up clutch 134. The solenoid command may, for example, position the spool valve by applying a controlled pressure to the spool that is reacted against by the return spring and flow forces. Similarly, in response to a second, alternate torque converter lock-up clutch solenoid command, clutch apply regulatory valve 112 may reverse the flow direction, directing transmission fluid into converter release circuit 104 to disengage torque converter lock-up clutch 134. Further, by adjusting a degree of opening of clutch apply regulatory valve 112, flow and hydraulic pressure in converter apply circuit 102 may be modulated to provide partial engagement of torque converter lock-up clutch 134. To disengage the clutch, that is, in the release flow direction, it may not be necessary to modulate the release pressure. Specifically, it may only be necessary to apply sufficient pressure to release the clutch.

Flow restriction valve 120 may also be included in hydraulic circuit 100. Specifically, flow restriction valve 120 may be located in converter release circuit 104, and positioned upstream of a system cooler and/or lube, to restrict or un-restrict exhaust flow of transmission fluid into the cooler. In one example, during engine running conditions, flow restriction valve 120 may remain open, thereby un-restricting flow out of the torque converter lock-up clutch, and clutch apply regulatory valve 112 may modulate flow and pressure of transmission fluid into the torque converter lock-up clutch. In another example, during engine shut-down conditions (that is, reduced pump output conditions), flow restriction valve 120 may be closed (for example, at least partially closed), thereby restricting flow out of torque converter lock-up clutch 134 and restricting flow into the cooler, to thereby maintain flow and pressure of transmission fluid through the torque converter lock-up clutch. In one example, restricting flow may include fully closing flow restriction valve 120. Herein, the flow restriction valve 120 may be operated as an on/off flow control valve. In another example, restricting flow may include partially closing flow restriction valve 120. Subsequently, the flow and pressure in converter apply circuit 102 and a degree of engagement of torque converter lock-up clutch 134 may be modulated by adjusting clutch apply regulatory valve 112.

FIG. 2B depicts a second torque converter hydraulic circuit 200 including a three-pass torque converter 228 coupled to a torque converter lock-up clutch 234. The three-pass torque converter includes three hydraulic lines providing transmission fluid in and out of torque converter 228 via torque converter lock-up clutch 234. Specifically, converter apply circuit 202 and converter release circuit 204 supply transmission fluid from a pump into the torque converter lock-up clutch 234 while converter open circuit 206 exhausts transmission fluid into a cooler and/or lube. Flow through converter apply circuit 202 and/or converter release circuit 204 may be regulated by clutch apply regulatory valve 212. Alternatively, flow through converter release circuit 204 may be regulated by an optional clutch release regulatory valve 214.

The direction of fluid flow determines an engagement state of the torque converter lock-up clutch 234. Specifically, flow of transmission fluid from converter apply circuit 202 to converter open circuit 206 enables engagement of torque converter lock-up clutch 234 (and lock-up of torque converter 228) while flow of transmission fluid from converter release circuit 204 to converter open circuit 206 enables disengagement of torque converter lock-up clutch 234 (and unlocking of torque converter 228). A switching valve (not shown) included in converter open circuit 206 may enable the above mentioned switch in flow through converter open circuit 206. Further, a degree of engagement may be varied by adjusting clutch apply regulatory valve 212.

Flow restriction valve 220 may be included in converter open circuit 206 to restrict (for example, fully restrict or partially restrict) an exhaust flow of transmission fluid out of the torque converter lock-up clutch. Specifically, during engine shut-down conditions, flow restriction valve 220 may be closed to restrict fluid flow out of converter open circuit 206, and to maintain flow and pressure of transmission fluid through the torque converter lock-up clutch. Thus, in one example, flow restriction valve 220 may be operated as an on/off flow control valve. Subsequently, the flow and pressure in converter apply circuit 202 and thereby a degree of engagement of torque converter lock-up clutch 234 may be modulated by adjusting clutch apply regulatory valve 212.

FIG. 2C depicts a third torque converter hydraulic circuit 250 including a closed-piston torque converter 278 coupled to a torque converter lock-up clutch 284. The closed-piston torque converter 278 may include three hydraulic lines providing flowing of transmission fluid in and out of torque converter 278 via torque converter lock-up clutch 284. Specifically, converter apply circuit 252 and converter release circuit 254 may supply transmission fluid from a pump into the torque converter lock-up clutch 284 while converter open circuit 256 may exhaust transmission fluid into a cooler and/or lube. Flow through converter apply circuit 252 and/or converter release circuit 254 may be regulated by clutch apply regulatory valve 262. Alternatively, flow through converter release circuit 254 may be regulated by an optional clutch release regulatory valve 264.

Herein, in addition to the direction of flow, a pressure in converter apply circuit 252 and/or a pressure difference between converter apply circuit 252 and converter release circuit 254 may determine the engagement state of torque converter lock-up clutch 284. In one example, a pressure sensor 266 may estimate a pressure difference between converter apply circuit 252 and converter release circuit 254. To engage torque converter lock-up clutch 284 (and lock-up torque converter 278), transmission fluid may flow from converter apply circuit 252 to converter open circuit. In comparison, to disengage torque converter lock-up clutch 284 (and unlock torque converter 278), transmission fluid may flow from converter release circuit 254 to converter open circuit 256. A switching valve (not shown) included in converter open circuit 256 may enable the abovementioned switch in flow through converter open circuit 256. Further, a degree of engagement of the clutch may be varied by adjusting clutch apply regulatory valve 262.

Flow restriction valve 270 may be included in converter open circuit 256 to restrict (for example, fully restrict or partially restrict) exhaust flow of transmission fluid into the cooler. Specifically, during engine shut-down conditions, flow restriction valve 270 may be closed to restrict fluid flow out of converter open circuit 256, and to maintain flow and pressure of transmission fluid through the torque converter lock-up clutch 284. Subsequently, the flow and pressure in converter apply circuit 252 and a degree of engagement of torque converter lock-up clutch 284 may be modulated by adjusting clutch apply regulatory valve 262.

While FIGS. 2A-C illustrate adjusting a flow rate and pressure of fluid in the torque converter using the restriction valve, it will be appreciated that alternate embodiments, are possible.

In each of the embodiments of FIG. 2A-C, during an engine shutdown, exhaust flow of transmission fluid from the torque converter into a cooler and/or lube section of a vehicle may be restricted to thereby maintain pressure in the hydraulic circuit and maintain an engagement state of the clutch. By using a restriction valve in the outlet of a torque converter clutch hydraulic circuit, the flow rate required to generate a desired apply pressure (to thereby adjust an engagement state of the clutch, and a torque output) may be reduced. In alternate embodiments, the flow rate may be adjusted using both the restriction valve in the outlet of the hydraulic circuit as well as a flow control valve (such as, the clutch apply regulatory valve) in the inlet of the hydraulic circuit. In this way, during engine spin down, the engaged torque converter lock-up clutch may apply an increased drag torque on the engine to expedite engine spin-down.

Now turning to FIG. 3, an example torque converter lock-up routine 300 is described. The example routine may be used to lock-up a torque converter, by the engagement of a torque converter lock-up clutch, based on the presence or absence of engine idle-stop conditions.

At 302, it may be confirmed whether a torque converter lock-up has been requested. In one example, torque converter lock-up may be requested to enable modulation of the engine torque output. If no lock-up has been requested, the routine may end. If a torque converter lock-up request is confirmed, at 304, it may be determined whether the lock-up has been requested under engine shut-down conditions (for example, engine idle-stop conditions).

If engine shut-down conditions are not confirmed, that is, the torque converter lock-up has been requested during engine running conditions, at 306, exhaust flow out of the torque converter may be un-restricted, for example, by opening a flow restriction valve included in the torque converter hydraulic circuit. In one example, when the torque converter is a two-pass torque converter, the flow restriction valve may be opened to un-restrict flow out of a converter release circuit. In another example, when the torque converter is a three-pass or closed-piston torque converter, the flow restriction valve may be opened to un-restrict flow out of a converter open circuit.

At 308, the actuation of a torque converter lock-up clutch solenoid may be adjusted, for example energized or de-energized based on the orientation of the solenoid, by appropriately adjusting the solenoid's duty cycle. In one example, as depicted, the solenoid may be energized. In response to solenoid energization, at 310, a clutch apply regulatory valve (CARV) may adjust the hydraulic pressure and direction of fluid flow (as generated by the engine-driven mechanical pump) through the torque converter lock-up clutch to enable an engagement of the clutch and a consequent lock-up of the torque converter. As previously elaborated with reference to FIGS. 2A-C, engagement of the torque converter lock-up clutch may include, at 312, the CARV adjusting a flow of transmission fluid from the converter apply circuit to the converter release circuit, if the torque converter is a two-pass torque converter. Alternatively, if the torque converter is a three-pass or closed-piston torque converter, engagement of the torque converter lock-up clutch may include, at 314, the CARV adjusting a flow of transmission fluid from the converter apply circuit to the converter open.

If engine shut-down conditions are confirmed (at 304), then at 316, exhaust flow out of the torque converter may be restricted, for example, by at least partly closing the flow restriction valve. By closing the flow restriction valve, flow may be restricted out of a converter release circuit (in a two-pass torque converter) or a converter open circuit (in a three-pass or closed-piston torque converter). At 318, the duty cycle of the torque converter lock-up clutch solenoid may be adjusted to adjust the actuation state of the clutch solenoid. In one example, as depicted, the solenoid may be energized. In response to solenoid energization, at 320, the clutch apply regulatory valve (CARV) may adjust the hydraulic pressure and flow of transmission fluid to the torque converter lock-up clutch to enable an engagement of the clutch and a consequent lock-up of the torque converter. As previously elaborated, this may include (at 322) adjusting a flow of transmission fluid from the converter apply circuit to the converter release circuit in a two-pass torque converter, or (at 324) adjusting a flow of transmission fluid from the converter apply circuit to the converter open circuit in a three-pass or closed-piston torque converter. In the absence of pump output, herein, by restricting flow out of the hydraulic circuit, torque capacity of the torque converter lock-up clutch may be restored. In one example, less than full torque capacity may be restored. However, the less than full restored capacity may be sufficient for locking the torque converter and applying a drag torque on the engine.

Now turning to FIG. 4, a routine 400 is described for performing an idle-stop operation in the vehicle system of FIG. 1 using a torque converter lock-up clutch (TCC)-based drag torque. At 402, idle-stop conditions may be confirmed. Any or all of the idle-stop conditions, as further described herein, may be met for an idle-stop condition to be confirmed. For example, it may be confirmed that the engine is operating (e.g., carrying out combustion), that the battery state of charge is more than a threshold amount (for example, 30%), that the vehicle running speed is within a desired range (for example, no more than 30 mph), that the air conditioner did not issue a request for restarting the engine (as may be requested if air conditioning is desired), that the engine temperature is within a selected temperature range (for example, above a predetermined threshold), that a start has not been requested by the vehicle driver (for example, as determined by the throttle opening degree), etc. If idle-stop conditions are not confirmed, the routine may end. However, if any or all of the idle-stop conditions are met, then at 404, the engine may be shut-down. At 406, the torque converter lock-up clutch may be engaged to lock-up the torque converter and a TCC-based drag torque (or external friction torque) may be applied through the torque converter lock-up clutch on the engine to expedite engine spin-down. In one example, if the vehicle is moving when the torque converter is locked-up, the direct coupling of the engine to the turbine shaft may allow the vehicle braking (through the wheels and/or wheel brakes) to directly slow down the vehicle and reduce engine speed (for example, bring down engine speed to zero). In another example, if the vehicle is stationary when the torque converter is locked-up, the engaged torque converter lock-up clutch drags the engine speed down to turbine speed (which is zero), enabling rapid engine spin-down. As previously elaborated with reference to FIG. 3, to apply the drag torque, a controller may close a flow restriction valve (FRV) to restrict flow out of the torque converter lock-up clutch. Further, the controller may modulate the hydraulic pressure generated in, and thereby the degree of engagement of, the torque converter lock-up clutch by adjusting the clutch apply regulatory valve.

The degree of engagement of the torque converter lock-up clutch (that is, whether the clutch is fully engaged, or partially engaged) may be adjusted in response to operating conditions, including, an engine speed and/or a desired engine stopping position. In one example, when the engine speed is above a desired engine speed, the degree of engagement of the torque converter lock-up clutch may be increased to increase the drag torque applied. In another example, when the engine speed is below a desired engine speed, the engagement of the torque converter lock-up clutch may be decreased to decrease the drag torque applied on the engine. In one example, the desired engine speed may include a desired speed trajectory enabling the engine speed to be smoothly brought down to rest. Herein, based on the desired speed trajectory, the degree of engagement of the torque converter lock-up clutch may be adjusted. Further, torque converter lock-up clutch slippage may be used, if required, to enable the engine speed to follow the desired speed trajectory. As such, the increased engagement of the torque converter lock-up clutch and the closed position of the flow restriction valve may be maintained until engine spin-down has been completed.

Next, at 408, engine spin-down to zero (or a predetermined threshold near zero, such as 50 RPM) may be confirmed. If engine spin-down is not confirmed, the routine may return to 406 to maintain application of the TCC-based drag torque until spin-down is achieved. When engine spin-down is confirmed, at 410, the flow restriction valve may be opened to un-restrict flow of transmission fluid out of the torque converter. Further, the engagement of the torque converter lock-up clutch may be reduced (for example, the torque converter lock-up clutch may be disengaged) to thereby un-lock the torque converter.

At 412, restart conditions (as elaborated with reference to FIG. 5) may be confirmed. If restart conditions are confirmed, then at 416, a restart operation (as elaborated with reference to FIG. 5) may be initiated. If restart conditions are not confirmed, the open position of the flow restriction valve and the reduced engagement (or disengaged) state of the torque converter lock-up clutch may then be maintained at least until a subsequent restart is commanded.

Figure 5:
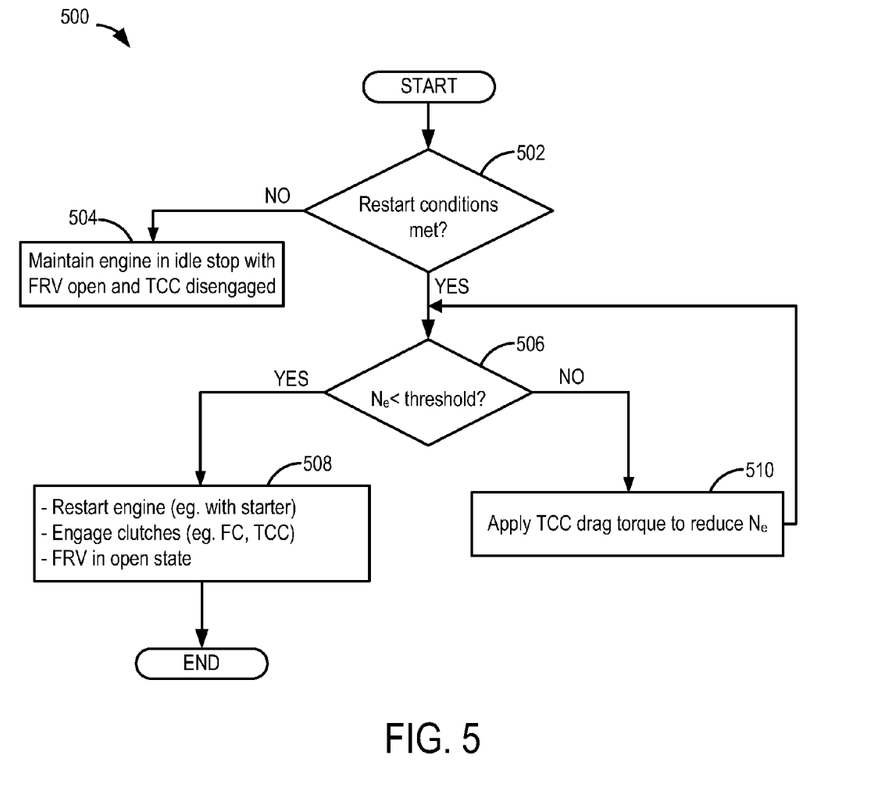
FIG. 5 shows a high level flow chart for executing a restart operation according to the present disclosure.

Now turning to FIG. 5, a routine 500 is described for performing a restart operation in the vehicle system of FIG. 1 using a torque converter lock-up clutch (TCC)-based drag torque. At 502, restart conditions may be confirmed. Any or all of the restart conditions, as further described herein, may be met for a restart condition to be confirmed. For example, it may be confirmed that the engine is in idle-stop (e.g., not carrying out combustion), that the battery state of charge is less than a threshold amount (for example, 30%), that the air conditioner did issue a request for restarting the engine (as may be requested if air conditioning is desired), that an emission control device temperature is below a threshold, that a brake pedal has been released, that a start has been requested by the vehicle driver (for example, as determined by the throttle opening degree or the accelerator pedal position), etc. If restart conditions are not confirmed, at 504, a controller may maintain the engine in idle-stop with the flow restriction valve in an open position and with the torque converter lock-up clutch disengaged (or with reduced engagement). However, if any or all of the restart conditions are met, then at 506, the engine speed may be estimated and it may be determined whether the engine speed is below a threshold, such as a threshold (for example, 50 RPM) below which a started may be actuated. If the engine speed is below the threshold, then at 508, the engine may be cranked (for example, with the help of a starter) to restart the engine. Further, the flow restriction valve may be opened to un-restrict flow through the torque converter lock-up clutch and one or more transmission clutches (for example, a forward clutch and/or a torque converter lock-up clutch) may be engaged to transfer the torque generated by the engine to the wheels. That is, the engine may be cranked with the torque converter lock-up clutch disengaged, the torque converter unlocked, and the flow restriction valve open. Then, as the engine speed rises, with the flow restriction valve open, the engagement of one or more transmission clutches may be increased.

In comparison, if the engine speed is above the threshold, then at 510, a TCC-based drag torque may be applied on the engine to rapidly reduce the engine speed to the threshold from where the engine may be cranked. That is, the flow restriction valve may be closed and the engagement state of the torque converter lock-up clutch may be modulated to increase a drag torque on the engine to reduce the engine speed. Then, once the engine speed has dropped, the flow restriction valve may be returned to the open state and the torque converter lock-up clutch may be disengaged, and an engine restart and crank may ensue.

Figure 6:
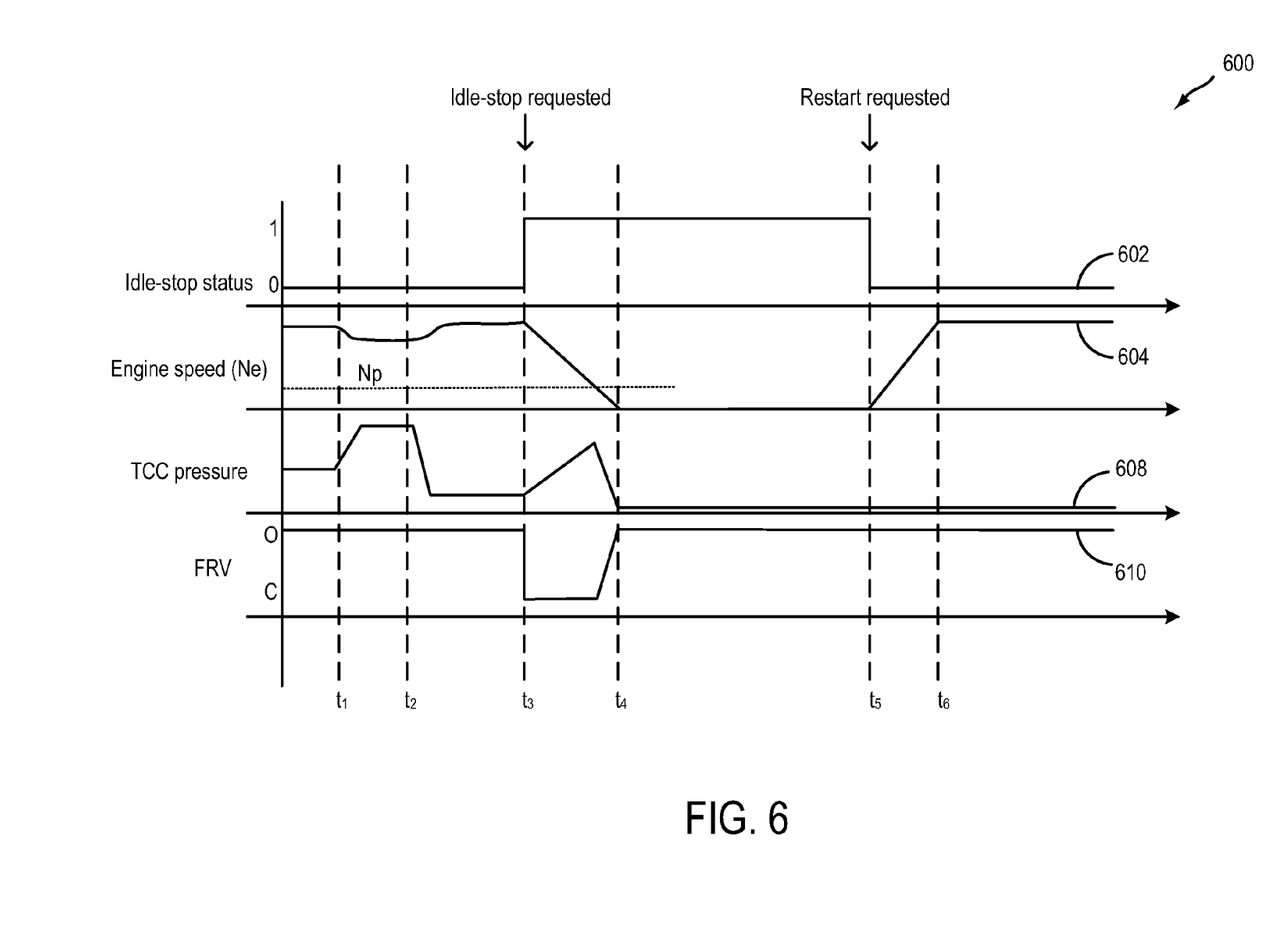
FIG. 6 shows a map with a plurality of graphs explaining example engine shut-down and restart procedures, according to the present disclosure.

Now turning to FIG. 6, map 600 depicts example engine shutdown and restart scenarios with a plurality of graphs 602-610.

An indication of idle-stop status (0 or 1) is provided in graph 602. Graph 604 depicts changes in engine speed during the example engine idle-stop and/or restart operations. Graph 606 depicts changes in clutch pressure (and hence, engagement status) of a torque converter lock-up clutch (TCC) during the idle-stop and subsequent restart operations. Graph 610 provides an indication of the open (O) or closed (C) status of the flow restriction valve (FRV).

At $t_3$, an idle-stop request (1) may be confirmed (for example, by confirming idle-stop conditions) and an idle-stop operation may be initiated. Herein, an idle-stop engine shutdown operation may be performed in response to the presence of idle-stop conditions and without the vehicle operator requesting an engine shut-down (for example, by turning off the vehicle ignition, and hence the engine). As depicted, the idle-stop conditions may prevail until $t_5$ when a subsequent restart request is confirmed. However, the majority of adjustments required to attain an engine shut-down upon confirmation of idle-stop conditions, may be performed between $t_3$ and $t_4$. At $t_5$, idle-stop may be stopped due to confirmation of restart conditions. While restart conditions may prevail long after $t_5$, the majority of adjustments required to attain an engine restart upon confirmation of restart conditions, may be performed between $t_5$ and $t_6$.

At the time the idle-stop is requested ($t_3$), the engine may be running at a higher engine speed (as shown in 604), the flow restriction valve (FRV) may be open (as shown in 610), and torque converter lock-up clutch (TCC) may be partially engaged (as shown at 608) or alternatively may be disengaged. At $t_3$, when idle-stop conditions are confirmed, the engine may be shut-down and a reduction of engine speed may be initiated with the help of an increased TCC-based drag torque to thereby expedite engine spin-down. Specifically, in response to the idle-stop request, FRV may be closed to thereby enable the clutch capacity of the TCC to be improved in the absence of a pump-driven hydraulic output. With FRV closed, the TCC pressure may be increased (by example, by adjusting flow through a converter apply regulatory valve) to enable an engagement of the clutch and a lock-up of the torque converter. That is, when idle-stop conditions are met, a controller may increase restriction of the flow restriction valve, and while maintaining the increased restriction, the controller may adjust the degree of engagement of the torque converter lock-up clutch to thereby adjust the torque converter drag torque applied on the engine. In one example, as depicted, the maximum clutch pressure and capacity attainable during idle-stop conditions may be less than the full capacity attainable during engine running conditions when a system pump is running. In the depicted example, the engagement of TCC may be further adjusted responsive to engine speed. For example, when the engine speed is above a threshold (Np), the clutch pressure and engagement of TCC may be increased to increase the drag torque applied and when the engine speed drops below the threshold, the clutch pressure and engagement of TCC may be decreased to decrease the drag torque applied. For example, when the engine speed is below the threshold, the TCC may be disengaged. Further, when the engine speed drops below the threshold, FRV may be opened to expedite the decrease in engagement, or disengagement, of the TCC. In this way, using the transmission drag torque, the speed of the engine may be reduced to zero engine speed by $t_4$.

Once engine spin-down is attained, FRV may remain opened and TCC may remain disengaged until an engine restart is requested. In response to a subsequent engine restart request, for example at $t_5$, the engine may be cranked to restart the engine with the torque converter clutch in the disengaged (or reduced engagement condition) and with the flow restriction valve open. Following engine restart, FRV may remain open to allow the output of the system mechanical pump to be used for clutch pressure modulation. During the engine restart, one or more alternate transmission clutches, such as a forward clutch may be engaged (not shown), so that an engine restart is attained by $t_6$ with a desired engine speed profile. Once the restart has been established, the clutches may be maintained in the engaged state with the FRV maintained open.

In comparison, a TCC torque modulation may be requested during engine running conditions, such as for example during a gear shift, as depicted in FIG. 6 at $t_1$. Herein, in response to the torque modulation request, FRV may be maintained in the open state. As the clutch pressure of TCC is increased between $t_1$ and $t_2$, a small drop in engine speed may be experienced. Following the gear shift (after $t_2$), the clutch pressure may be decreased to return the clutch to a less engaged (or disengaged) state.

In this way, a torque converter lock-up clutch may be engaged during engine idle-stop conditions to expedite engine spin-down. By restricting flow out of the torque converter clutch during engine shut-down and pump-off conditions, the torque converter lock-up clutch capacity may be restored to thereby enable a larger and longer engagement of the clutch during the pump-off conditions. By expediting engine spin-down, fuel economy benefits may be achieved and the quality of frequent start/stops may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle system including a selectively shut-down engine, the system further including a torque converter and a torque converter lock-up clutch, comprising:
during an idle-stop engine shut-down,
restricting flow of transmission fluid out of the torque converter, including restricting flow into a cooler; and
adjusting engagement of the torque converter lock-up clutch to adjust a drag torque on the engine to stop the engine.

2. The method of claim 1 wherein the torque converter includes a flow restriction valve, and wherein restricting flow out of the torque converter includes at least partially closing the flow restriction valve to restrict flow of transmission fluid from the torque converter.

3. The method of claim 2 wherein the flow restriction valve is positioned in a torque converter lock-up converter release circuit when the torque converter is a two-pass torque converter.

4. The method of claim 2 wherein the flow restriction valve is positioned in a torque converter lock-up clutch out circuit when the torque converter is either a three-pass or a closed-piston type torque converter.

5. The method of claim 2 wherein adjusting a hydraulic actuation of the torque converter lock-up clutch includes adjusting a degree of engagement of the clutch by adjusting flow through a clutch apply regulatory valve responsive to engine operating conditions including engine speed and/or a desired stopping position of the engine.

6. The method of claim 5 wherein adjusting the degree of engagement of the clutch responsive to engine speed includes, increasing the degree of engagement of the clutch to increase the drag torque in response to engine speed being above a desired engine speed, and decreasing the degree of engagement of the clutch to decrease the drag torque in response to engine speed being below the desired engine speed.

7. The method of claim 6, further comprising, after completing the idle-stop engine shut-down,
opening the flow restriction valve to un-restrict flow of transmission fluid out of the torque converter;
reducing engagement of the torque converter lock-up clutch; and
cranking the engine to restart the engine with the torque converter lock-up clutch in a reduced engagement condition and with the flow restriction valve open.

8. The method of claim 1, wherein the adjusting includes:
increasing engagement of the torque converter lock-up clutch to stop the engine during the idle-stop engine shut-down, where a degree of engagement of the torque converter lock-up clutch is varied responsive to operating conditions; and
decreasing engagement of the torque converter lock-up clutch during an engine stop.

9. A method of expediting an engine shut-down of an engine during engine idle-stop conditions in a system, including a flow restriction valve configured to restrict a flow of transmission fluid out of a torque converter, comprising:
when idle-stop conditions are met,
increasing restriction of the flow restriction valve;
while maintaining said increased restriction, adjusting engagement of a torque converter lock-up clutch responsive to operating conditions to adjust a torque converter drag torque applied on the engine; and
after completing the engine shutdown,
opening the flow restriction valve to un-restrict flow of transmission fluid out of the torque converter;
reducing engagement of the torque converter lock-up clutch; and
cranking the engine during a subsequent engine restart with the torque converter lock-up clutch in the reduced engagement condition and with the flow restriction valve open.

10. The method of claim 9, wherein the operating conditions include an engine speed, and wherein adjusting engagement includes, increasing engagement of the clutch to increase the torque converter drag torque applied on the engine in response to engine speed being above a desired engine speed, and decreasing engagement of the clutch to decrease the torque converter drag torque in response to engine speed being below the desired engine speed.

11. The method of claim 9, wherein adjusting engagement includes,
increasing engagement of the torque converter lock-up clutch to stop the engine during the shut-down; and
decreasing engagement of the torque converter lock-up clutch during an engine stop.

12. The method of claim 9 wherein the flow restriction valve is positioned in a converter release circuit when the torque converter is a two-pass torque converter, and is positioned in a clutch out circuit when the torque converter is either a three-pass torque converter or a closed-piston torque converter.

13. The method of claim 12 wherein the flow restriction valve is positioned upstream of a cooler, and wherein restricting flow of transmission fluid out of the torque converter includes restricting flow of transmission fluid into the cooler.

14. The method of claim 9 further comprising, adjusting the engagement of a transmission forward clutch to further adjust the torque converter drag torque applied on the engine.

* * * * *